United States Patent
Hilt et al.

(10) Patent No.: US 9,847,942 B2
(45) Date of Patent: Dec. 19, 2017

(54) NETWORK LOAD BALANCING AND OVERLOAD CONTROL

(71) Applicant: Alcatel Lucent, Boulogne-Billancourt (FR)

(72) Inventors: Volker Hilt, Monmouth, NJ (US); Indra Widjaja, Florham Park, NJ (US)

(73) Assignee: WSOU Investments, LLC, Los Angeles, CA (US)

(*) Notice: Subject to any disclaimer, the term of this patent is extended or adjusted under 35 U.S.C. 154(b) by 0 days.

(21) Appl. No.: 14/939,587

(22) Filed: Nov. 12, 2015

(65) Prior Publication Data

US 2016/0065475 A1 Mar. 3, 2016

Related U.S. Application Data

(63) Continuation of application No. 11/395,455, filed on Mar. 31, 2006, now Pat. No. 9,219,686.

(51) Int. Cl.
*H04L 12/801* (2013.01)
*H04L 12/803* (2013.01)
(Continued)

(52) U.S. Cl.
CPC ........... *H04L 47/12* (2013.01); *H04L 45/22* (2013.01); *H04L 47/10* (2013.01); *H04L 47/11* (2013.01);
(Continued)

(58) Field of Classification Search
CPC ...................................... H04L 47/12
(Continued)

(56) References Cited

U.S. PATENT DOCUMENTS

| 4,914,650 | A | | 4/1990 | Sriram |
| 4,974,256 | A | * | 11/1990 | Cyr ...................... H04M 3/365 379/112.04 |

(Continued)

FOREIGN PATENT DOCUMENTS

WO   PCTUS2007008244   8/2007

OTHER PUBLICATIONS

Blake et al., "An Architecture for Differentiated Services", 1998.*

(Continued)

*Primary Examiner* — O. C. Vostal
(74) *Attorney, Agent, or Firm* — Sean D. Burdick

(57) ABSTRACT

Load balancing and overload control techniques are disclosed for use in a SIP-based network or other type of network comprising a plurality of servers. In a load balancing technique, a first server receives feedback information from at least first and second downstream servers associated with respective first and second paths between the first server and a target server, the feedback information comprising congestion measures for the respective downstream servers. The first server dynamically adjusts a message routing process based on the received feedback information to compensate for imbalance among the congestion measures of the downstream servers. In an overload control technique, the first server utilizes feedback information received from at least one downstream server to generate a blocking message for delivery to a user agent.

20 Claims, 11 Drawing Sheets

(51) Int. Cl.
   *H04L 12/825* (2013.01)
   *H04L 29/06* (2006.01)
   *H04L 29/08* (2006.01)
   *H04L 29/14* (2006.01)
   *H04L 12/707* (2013.01)

(52) U.S. Cl.
   CPC .......... *H04L 47/122* (2013.01); *H04L 47/263* (2013.01); *H04L 65/1006* (2013.01); *H04L 65/1016* (2013.01); *H04L 67/101* (2013.01); *H04L 67/1002* (2013.01); *H04L 67/1008* (2013.01); *H04L 67/1023* (2013.01); *H04L 69/40* (2013.01)

(58) Field of Classification Search
   USPC ........................................................ 709/235
   See application file for complete search history.

(56) References Cited

U.S. PATENT DOCUMENTS

| | | | |
|---|---|---|---|
| 5,727,051 | A | 3/1998 | Holender |
| 6,134,218 | A | 10/2000 | Holden |
| 6,311,065 | B1 | 10/2001 | Ushiki et al. |
| 6,469,991 | B1 | 10/2002 | Chuah |
| 6,496,811 | B1 | 12/2002 | Bodnar |
| 6,507,562 | B1* | 1/2003 | Kadansky ........... H04L 12/1877 370/216 |
| 6,542,462 | B1 | 4/2003 | Sohraby et al. |
| 6,578,068 | B1 | 6/2003 | Bowman-Amuah |
| 6,618,378 | B1 | 9/2003 | Giroux et al. |
| 6,680,943 | B1* | 1/2004 | Gibson ................... H04L 29/06 370/392 |
| 6,778,496 | B1 | 8/2004 | Meempat et al. |
| 6,888,797 | B1 | 5/2005 | Cao et al. |
| 6,904,017 | B1 | 6/2005 | Meempat et al. |
| 7,050,424 | B2* | 5/2006 | Cheng ............... H04L 29/06027 370/352 |
| 7,069,342 | B1 | 6/2006 | Biederman |
| 7,170,905 | B1* | 1/2007 | Baum ................. H04L 47/2408 370/401 |
| 7,225,271 | B1* | 5/2007 | DiBiasio ............. H04L 12/5695 709/224 |
| 7,277,423 | B1* | 10/2007 | Welch ................. H04L 12/5695 370/352 |
| 7,305,477 | B2* | 12/2007 | Gbadegesin ....... H04L 29/12009 709/227 |
| 7,319,667 | B1 | 1/2008 | Biederman |
| 7,409,441 | B2 | 8/2008 | Kake et al. |
| 7,447,194 | B1* | 11/2008 | Schlesener .......... H04L 65/1043 370/352 |
| 7,483,374 | B2* | 1/2009 | Nilakantan ............. H04L 45/04 370/235 |
| 7,509,229 | B1 | 3/2009 | Wen |
| 7,555,560 | B2 | 6/2009 | Hassan |
| 7,689,223 | B1* | 3/2010 | Lewis ................... H04W 76/02 370/230 |
| 7,864,939 | B1* | 1/2011 | Burg ................. H04M 3/42382 379/205.01 |
| 7,961,715 | B1* | 6/2011 | Dhesikan ................ H04L 12/66 370/352 |
| 9,124,465 | B1* | 9/2015 | Findlay ............. H04L 29/06027 |
| 2001/0014847 | A1 | 8/2001 | Keenan |
| 2001/0025310 | A1* | 9/2001 | Krishnamurthy G06Q 10/06395 709/223 |
| 2002/0035642 | A1* | 3/2002 | Clarke .................... H04L 47/10 709/244 |
| 2002/0120729 | A1 | 8/2002 | Faccin et al. |
| 2002/0186657 | A1 | 12/2002 | Jain et al. |
| 2003/0043742 | A1* | 3/2003 | De Maria ............... H04L 47/10 370/230 |
| 2003/0093462 | A1* | 5/2003 | Koskelainen ........... H04L 29/06 709/203 |
| 2003/0123432 | A1* | 7/2003 | Cheng ............... H04L 29/06027 370/352 |
| 2003/0174648 | A1* | 9/2003 | Wang .................. H04L 65/1013 370/235 |
| 2003/0198183 | A1 | 10/2003 | Henriques et al. |
| 2004/0148423 | A1* | 7/2004 | Key ........................ H04L 47/10 709/235 |
| 2004/0152469 | A1* | 8/2004 | Yla-Outinen ....... H04L 65/1006 455/453 |
| 2004/0205190 | A1* | 10/2004 | Chong ................ H04L 65/1043 709/225 |
| 2005/0003824 | A1 | 1/2005 | Siris |
| 2005/0015492 | A1* | 1/2005 | Kumbalimutt ...... H04L 67/1006 709/226 |
| 2005/0055436 | A1 | 3/2005 | Yamada et al. |
| 2005/0117576 | A1* | 6/2005 | McDysan .............. H04L 45/308 370/389 |
| 2005/0163126 | A1 | 7/2005 | Bugenhagen et al. |
| 2005/0220095 | A1* | 10/2005 | Narayanan ............ H04L 63/126 370/389 |
| 2006/0002312 | A1* | 1/2006 | Delattre ................ H04L 45/125 370/254 |
| 2006/0050640 | A1 | 3/2006 | Jin et al. |
| 2006/0198309 | A1* | 9/2006 | Cortes ............... H04L 29/06027 370/241 |
| 2007/0025301 | A1* | 2/2007 | Petersson ................ H04L 47/10 370/338 |
| 2007/0037581 | A1 | 2/2007 | Morita |
| 2007/0121673 | A1* | 5/2007 | Hammer ............... H04L 41/026 370/468 |
| 2007/0153813 | A1* | 7/2007 | Terpstra ............ H04L 29/06027 370/401 |
| 2007/0180113 | A1* | 8/2007 | Van Bemmel ...... H04L 67/1008 709/226 |
| 2008/0114850 | A1 | 5/2008 | Skog et al. |

OTHER PUBLICATIONS

Braden et al., "Recommendations on Queue Management and Congestion Avoidance in the Internet", RFC 2309, 1998.*
Braden et al., "Resource ReSerVation Protocol (RSVP)—Version 1 Functional Specification", RFC 2205, 1997.*
Floyd, "Congestion Control Principles", RFC 2914, 2000.*
Geneiatakis et al., "Survey of Security Vulnerabilities in Session Initiation Protocol", 2006.*
Jacobson et al., "Congestion Avoidance and Control", 1988.*
Nagle, "Congestion Control in IP/TCP Internetworks", RFC 896, 1984.*
Ohta, "Overload Protection in a SIP Signaling Network", 2006.*
Ramakrishnan et al., "A Proposal to add Explicit Congestion Notification (ECN) to IP", 1999.*
Rosenberg et al., "SIP: Session Initiation Protocol", RFC 3261, 2002.*
Shen et al., "Session Initiation Protocol (SIP) Server Overload Control: Design and Evaluation", 2008.*
Shen et al., "On TCP-based SIP Server Overload Control", 2010.*
Turanyi et al., "Load Control: Congestion Notifications for Real-time Traffic", 2001.*
Wang, "SIP Overload Control: A Backpressure-based Approach", 2008.*
Welzl et al., "Congestion Control in the RFC Series", RFC 5783, 2010.*
Wijnen et al., "View-based Access Control Model (VACM) for the Simple Network Management Protocol (SNMP)", RFC 2275, 1998.*
Yang et al., "An Optimized Algorithm for Overload Control of SIP signaling Network", 2009.*
Ejzak et al., "Network Overload and Congestion: A Comparison of ISUP and SIP", 2004.*
Geng et al., "A SIP Message Overload Transfer Scheme", 2006.*
Handley et al., "SIP: Session Initiation Protocol", RFC 2543, 1999.*
Hilt et al., "Controlling Overload in Networks of SIP Servers", 2008.*
Hilt et al., "Design Considerations for Session Initiation Protocol (SIP) Overload Control", RFC 6357, 2011.*

(56) References Cited

OTHER PUBLICATIONS

Hilt et al., "Session Initiation Protocol (SIP) Overload Control", 2010.*
Hong et al., "A Comparative Study of SIP Overlaod Control Algorithms", 2012.*
Rosenberg, "Requirements for Management of Overload in the Session Initiation Protocol", RFC5390, 2008.*
Shen et al., "On TCP-based SIP Server Overload Control", 2009.*
Camarillo et al., "Integration of Resource Management and Session Initiation Protocol (SIP)", RFC3312, 2002.*
Carmarillo et al., "Integrated Services Digital Network (ISDN) User Part (ISUP) to Session Initiation Protocol (SIP) Mapping", RFC3398, 2002.*
Cisco, "SIP Troubleshooting: SIP Calls Receives 500 Internal Server Error 'Routing Failed' Event", 1992-2015.*
Handley et al., "SIP: Session Initiation Protocol", RFC2543, 1999.*
Mosavat et al., "SIP Extensions for the eXtensible Service Protocol", 2003.*
Nagle, "Congestion Control in IP/TCP Internetworks", RFC896, 1984.*
Walker et al., "Multiserivce Switching Forum Implementation Agreement for SIP interface between Call Agent and Service Broker", MSF-IA-SIP .005-FINAL, 2004.*
Wikipedia, "List of SIP response codes", 2017.*
Katrinis et al., "Dynamic Adaptation of Source Specific Distribution Trees for Multiparty Teleconferencing," Proceedings of the ACM Conference on Emerging Network Experiment and Technology (CoNEXT), Oct. 2005, pp. 156-165, Toulouse, France.
S. Yin et al., "MALB: MANET Adaptive Load Balancing," IEEE 60th Vehicular Technology Conference (VTC), Sep. 2004, pp. 2843-2847, vol. 4.
Joseph Y. Hui, "A Congestion Measure for Call Admission and Traffic Engineering for Multi-Layer Multi-Rate Traffic," International Journal of Digital and Analog Communication Systems, Apr. 1990, pp. 127-135, vol. 3, No. 2.
M. Talla et al., "Global Congestion Control in Hybrid ATM/TDMA Networks," Communications: The Key to Global Prosperity, Global Telecommunications Conference (GLOBECOM), Nov. 1996, pp. 147-151, vol. 1, London, United Kingdom.
S. Kasera et al., "Robust Multiclass Signaling Overload Control," Proceedings of the 13th IEEE International Conference on Network Protocols (ICNP), Nov. 2005, pp. 246-258.
J. Rosenberg et al., "SIP: Session Initiation Protocol," Network Working Group, Request for Comments: 3261, Jun. 2002, 269 pages.
J. Rosenberg et al., "Session Initiation Protocol (SIP): Locating SIP Servers," Network Working Group, Request for Comments 3263, Jun. 2002, 17 pages.
B.T. Doshi et al., "Overload Performance of Several Processor Queueing Disciplines for the M/M/1 Queue," IEEE Transactions on Communications, Jun. 1986, pp. 538-546, vol. COM-34, No. 6.
R. Radhakrishna Pillai, "A Distributed Overload Control Algorithm for Delay-Bounded Call Setup," IEEE/ACM Transactions on Networking, Dec. 2001, pp. 780-789, vol. 9, No. 6.
D.R. Manfield et al., "Performance Analysis of SS7 Congestion Controls Under Sustained Overload," IEEE Journal on Selected Areas in Communications, Apr. 1994, pp. 405-414, vol. 12, No. 3.
Michael Rumsewicz, "On the Efficacy of Using the Transfer-Controlled Procedure During Periods of STP Processor Overload in SS7 Networks," IEEE Journal on Selected Areas in Communications, Apr. 1994, pp. 415-423, vol. 12, No. 3.
R.P. Ejzak et al., "Network Overload and Congestion: A Comparison of ISUP and SIP," Bell Labs Technical Journal, Sep. 2004, pp. 173-182, vol. 8, No. 3.
S. Blake et al., "An Architecture for Differentiated Services," Network Working Group, Request for Comments: 2475, Dec. 1998, 36 pages.
John Nagle, "Congestion Control in IP/TCP Internetworks," Network Working Group, Request for Comments: 896, Jan. 1984, 9 pages.
S. Kasera et al., "Fast and Robust Signaling Overload Control," 9th International Conference on Network Protocols, Nov. 2001, pp. 323-331.
S. Floyd et al., "Random Early Detection Gateways for Congestion Avoidance," IEEE/ACM Transactions on Networking (TON), Aug. 1993, pp. 397-413, vol. 1, No. 4.

* cited by examiner

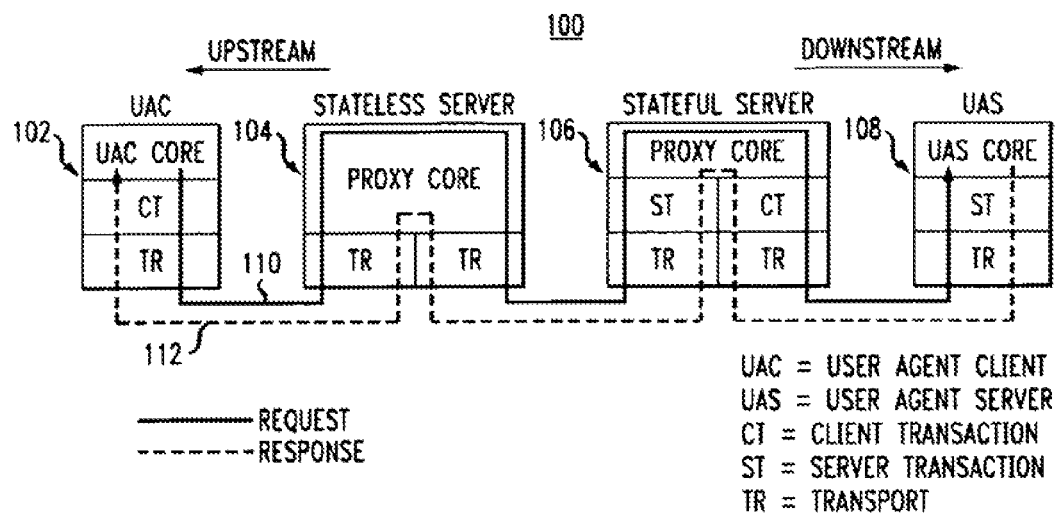
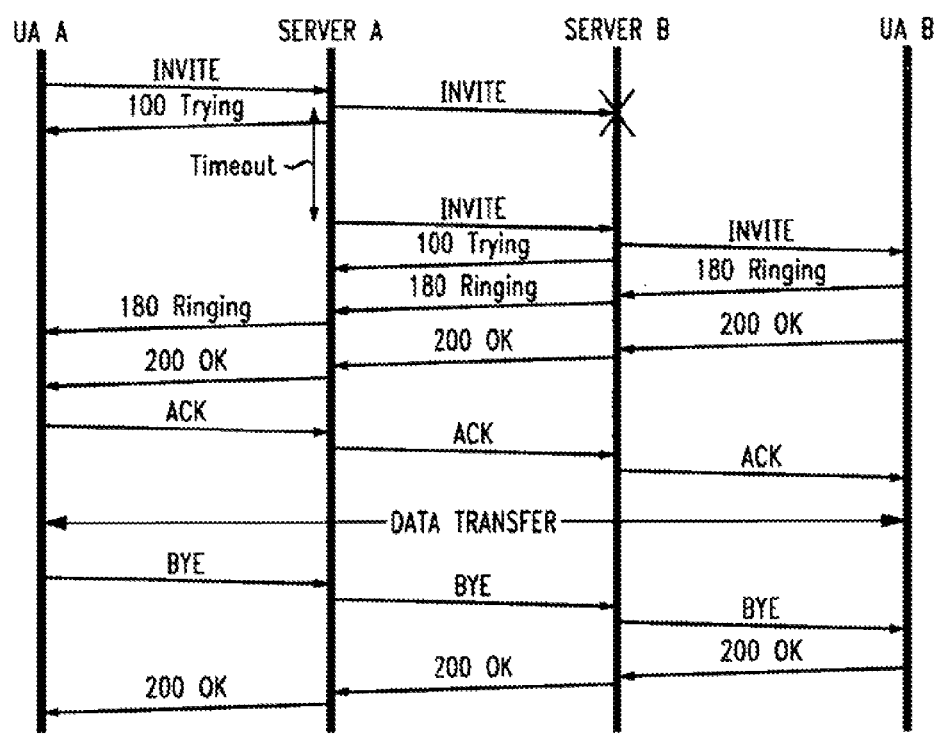

NETWORK LOAD BALANCING AND OVERLOAD CONTROL

RELATED APPLICATION

The present application is a continuation of U.S. patent application Ser. No. 11/395,455, filed Mar. 31, 2006, the disclosure of which is hereby incorporated by reference herein.

FIELD OF THE INVENTION

The present invention relates generally to communication networks, and more particularly to load balancing and overload control techniques for use in Session Initiation Protocol (SIP)-based networks, such as IP Multimedia Subsystem (IMS) networks, and other types of communication networks.

BACKGROUND OF THE INVENTION

Session Initiation Protocol (SIP) is rapidly becoming the de facto signaling protocol for establishing, modifying and terminating multimedia sessions between users in a communication network. SIP is described in J. Rosenberg et al., "SIP: Session Initiation Protocol," Internet Engineering Task Force (IETF) RFC 3261, June 2002, which is incorporated by reference herein. SIP has also been adopted for the IP Multimedia Subsystem (IMS), which is the next-generation core network architecture for mobile and fixed services defined by the 3rd Generation Partnership Project (3GPP).

A network element that processes and forwards SIP messages is called a proxy server in SIP terminology, and a Call Session Control Function (CSCF) in IMS terminology. 3GPP defines three types of CSCF elements: Proxy CSCF (P-CSCF) which is the interface to the user, Interrogating CSCF (I-CSCF) which provides an interface to other servers in different administration domains, and Serving CSCF (S-CSCF) which handles registration, enforces policy and provides an interface to application servers. Such network elements are referred herein as SIP/IMS servers, and a signaling network comprising these and other network elements is referred to as a SIP-based network.

In order to achieve high levels of performance in a SIP-based network, it is important to distribute the traffic load evenly over the network elements. Unfortunately, conventional load balancing techniques are often not well suited for use in the SIP context, and may fail to provide the desired performance levels.

A related problem in SIP-based networks involves overload control. Like other network elements, a SIP/IMS server can become overloaded when traffic demand exceeds its available resources, for example, its available processing resources. Even with over-provisioning, overload may still occur for various reasons including temporary traffic surges due to "flash crowd" effect, node or link failures, poor routing, traffic diversion due to maintenance and denial-of-service attacks, etc.

A variety of techniques have been developed for addressing overload control in communication networks. These include, for example, overload control based on M/M/1 queuing systems, and overload control techniques developed for use in the Signaling System 7 (SS7) context.

Unfortunately, these and other conventional overload control techniques fail to address the quantitative impact of overload on SIP performance and fail to provide specific approaches for handling overload in SIP-based networks, which are often more complex in terms of messaging services and signaling topologies.

It is therefore apparent that a need exists for improved load balancing and overload control techniques, particularly in SIP-based networks.

SUMMARY OF THE INVENTION

The present invention in an illustrative embodiment provides improved techniques for load balancing and overload control in a SIP-based network or other type of communication network.

In accordance with one aspect of the invention, a load balancing technique is provided in which a first server receives feedback information from downstream servers of the network, the downstream servers including at least first and second downstream servers associated with respective first and second paths between the first server and a target server, the feedback information comprising congestion measures for the respective downstream servers. The congestion measures may be, for example, processor utilization measures, message processing loads, buffer occupancy measures, message processing delays, or any other type of information indicative of congestion, or combinations thereof. The feedback information may be transmitted from the downstream servers to the first server in one or more SIP 100 response messages, for example, encoded in an extension header. A message routing process in the first server is adjusted based on the received feedback information to compensate for imbalance among the congestions measures of the downstream servers. The adjustment in an illustrative embodiment is dynamic, so as to ensure that the message routing process keeps track of prevailing network conditions, thereby improving capacity utilization in the network.

The above-described receipt of feedback information and associated adjustment of the message routing process may be replicated at each server in a network. In other words, each of the servers may operate as the first server relative to other servers of the network.

The feedback information may comprise a highest congestion measure among the congestion measures of a plurality of servers in the first or second paths between the first server and the target server.

One of the first and second downstream servers may be the target server itself, or a nearest neighboring server of the first server.

The message routing process may be adjusted by, for example, adjusting routing information which specifies relative percentages of a given set of messages to be routed on the first and second paths. The routing information may comprise at least first and second routing probabilities for the respective first and second paths, stored in a routing table or other suitable data structure.

In accordance with another aspect of the invention, an overload control technique is provided in which a first server receives feedback information from at least one downstream server of the network, the downstream server being associated with a path between the first server and a target server, the feedback information comprising a congestion measure of the downstream server. The first server generates a blocking message for delivery to a user agent based on the feedback information.

The downstream server may be the target server itself, or a nearest neighboring server of the first server. The first server may be an ingress server of the network, or a core network server that is the nearest upstream neighbor of the downstream server.

Again, the operations associated with the first server above may be replicated at other servers of the network. Thus, the load balancing and overload control techniques can be implemented in a distributed manner, without the need for any centralized controller.

The load balancing and overload control techniques of the invention may be used alone or in combination. An illustrative embodiment of the invention combines both techniques to provide an enhanced communication protocol referred to herein as "Overload-Safe SIP" or OS-SIP. Advantageously, OS-SIP avoids a congestion collapse problem typically exhibited by conventional SIP, while also providing higher capacity and reduced ring delay and call setup time. Thus, OS-SIP delivers significant performance improvement and offers high-reliability service independent of traffic loads.

These and other features and advantages of the present invention will become more apparent from the accompanying drawings and the following detailed description.

BRIEF DESCRIPTION OF THE DRAWINGS

FIG. 1 is a simplified block diagram of a portion of a SIP-based network in which an embodiment of the invention is implemented.

FIG. 2 is a diagram illustrating call flow between network elements of a SIP-based network.

DETAILED DESCRIPTION OF THE INVENTION

Figure 3:
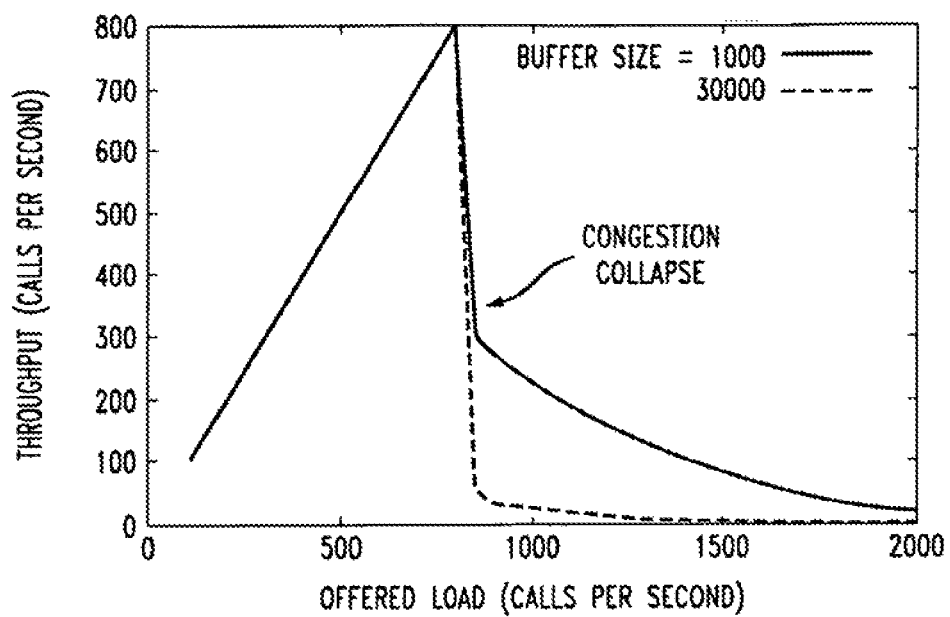
FIG. 3 is a plot of throughput as a function of offered load in a SIP-based network, illustrating a congestion collapse condition associated with conventional SIP techniques.

The present invention will be illustrated below in conjunction with exemplary SIP-based networks and associated load balancing and overload control techniques. It should be understood, however, that the invention is not limited to use with the particular load balancing or overload control techniques of the illustrative embodiments, nor with any particular type of network or other communication network. The disclosed techniques are suitable for use with a wide variety of other systems and in numerous alternative applications.

FIG. 1 shows a portion of a SIP-based network 100 in which an embodiment of the invention is implemented. The portion of the network 100 shown includes a communication path comprising a user agent client (UAC) 102 associated with a first end user, a first server 104, a second server 106, and a user agent server (UAS) 108 associated with a second end user. In the network 100, end users are handled by respective logical entities referred to as user agent (UAs). Each such UA comprises both a UAC and a UAS. The portion of the network 100 shown in FIG. 1 is considerably simplified for clarity of illustration, and a typical such network will include a multiplicity of servers serving many user agents. Also, the term "path" as used herein is intended to be construed broadly, to encompass any communication arrangement involving multiple servers of a network, and should not be viewed as requiring any particular type of link setup or communication protocol. Thus, a given path may, but need not, be set up in accordance with a communication protocol.

SIP messages from a UAC to a UAS are called requests and those in the reverse direction are called responses. In this particular example, the first end user, corresponding to UAC 102, represents a caller who transmits a request (e.g., initiating a call), while the second end user, corresponding to UAS 108, is a callee who receives the request from the caller and responds accordingly. The request and response are shown by the respective solid line 110 and dashed line 112. As is apparent, a given request from a UAC to a UAS may traverse multiple servers whose main purpose is to route messages closer to the end user. A server may rely on a domain name system (DNS) to resolve an IP address from a SIP address which is similar to an email address.

The SIP protocol is structured into multiple layers. The bottom layer is the transport (TR) layer which currently may utilize User Datagram Protocol (UDP) or Transmission Control Protocol (TCP). The transaction layer, which is the heart of SIP, uses the service of the transport layer and reliably delivers messages from one SIP entity to another through an IP-based network, which as noted previously will typically include a multiplicity of servers not explicitly shown in the figure. In particular, the transaction layer provides message retransmissions, matches responses to requests and facilitates timeouts. The transaction layer comprises client transaction (CT) and server transaction (ST) portions. The client transaction receives requests from its upper layer, which is the transaction user or the core, and reliably transmits the requests to its peer server transaction. The client transaction relies on timers and retransmissions to ensure that messages are received by its peer. The server transaction receives requests from the transport layer and delivers them to its core. In addition, the server transaction also provides filtering of retransmissions by transmitting appropriate responses to its peer client transaction. The interaction between the client and server transactions is governed by a set of finite-state machines (FSMs).

In the SIP-based network 100, there are two types of servers, namely, stateless server 104 and stateful server 106. A stateless server does not contain a transaction layer. Its function is merely to forward messages to the next hop. A stateful server, on the other hand, terminates a transaction layer and thus can also generate additional messages. For example, upon receiving a request from its upstream neighbor, a stateful server may generate multiple requests to multiple destinations, a technique known as "forking," in order to determine an appropriate location at which to contact the end user.

FIG. 2 is a diagram illustrating call flow between network elements of a SIP-based network such as network 100 of FIG. 1. In this example, it is assumed that a first UA, denoted UA A, initiates a call to a second UA, UA B. Messages between UA A and UA B pass through two servers, denoted Server A and Server B.

When UA A initiates the call to UA B, UA A typically sends an INVITE request containing UA B's SIP address to the outbound server (Server A) that serves UA A's domain. The INVITE request also contains other pertinent information needed by SIP, as well as additional information such as media and codec types needed for the bearer session. Upon receiving the INVITE request, Server A possibly performs a DNS query (not shown) to locate the inbound server (Server B) that serves UA B. Server A then forwards the INVITE request to Server B. In addition, Server A sends a 100 Trying response to UA A to indicate that INVITE processing is in progress.

Assume that the INVITE request is lost because Server B is congested. If the transport layer is unreliable (e.g., UDP), the transaction layer at Server A would detect the loss from the absence of 100 Trying, and retransmit the INVITE request. Eventually, when the INVITE request reaches the destination, UA B responds with a 180 Ringing response. If the callee decides to answer the call, a 200 OK response is sent to the caller, which may confirm the 200 OK response by returning an ACK. At this point, the bearer channel is established and communication or other data transfer between the caller and callee can begin. At the end of the session, either party can terminate the session by sending a BYE request. In this example, UA A terminates the session by sending a BYE request that is acknowledged by a 200 OK response from UA B.

A congestion collapse problem that can arise when SIP-based networks become overloaded will now be described with reference to FIG. 3. SIP message loss can primarily occur because of congestion in the IP transport network or at a server. In a well-designed network that carry both control and data traffic, SIP message loss in the IP transport network can be expected to be very low since SIP traffic is likely to be given higher priority than the much more dominant but less critical best-effort data traffic. This may be accomplished, for example, by using differentiated services, as described in S. Blake et al., "An architecture for differentiated services," IETF RFC 2475, December 1998. Thus, it is expected that message loss due to server congestion likely plays a much more prominent role in the SIP-based network.

SIP uses various timers, denoted A through K, to ensure reliable delivery of messages. When a server is congested, the timers may trigger more retransmissions which may cause more congestion. FIG. 3 illustrates an example of the call throughput performance of a server as a function of the offered load when the server is not subject to overload control. The plot is illustrated with two message buffer sizes at the server (B=1000 messages and B=30000 messages). As can be observed, when there is no overload control, the call throughput can significantly drop when the offered load exceeds the capacity of the server. Moreover, the call throughput performance worsens with increasing message buffer size. This behavior is consistent with congestion collapse for data traffic. See, for example, J. Nagle, "Congestion control in IP/TCP internetworks," IETF RFC 896, January 1984.

The present invention provides techniques which avoid the congestion collapse problem illustrated in FIG. 3. In an illustrative embodiment, these techniques include both load balancing and overload control techniques. It is to be appreciated, however, that the load balancing and overload control techniques described herein can be used separately from one another. That is, a given embodiment of the invention may implement only load balancing but not overload control, or vice versa.

A number of exemplary overload control algorithms suitable for use in conjunction with the present invention will now be described. For purposes of illustration, the algorithms are described as operating at a single server, rather than over a network of servers. Conventional aspects of the first two of these algorithms, known as the occupancy algorithm (OCC) and the acceptance rate algorithm, are respectively described in U.S. Pat. No. 4,974,256, issued Nov. 27, 1990 in the name of B. L. Cyr et al. and entitled "Load balancing and overload control in a distributed processing telecommunication system," and S. Kasera et al., "Fast and robust signaling overload control," International Conference on Network Protocols, 2001. However, such algorithms have not heretofore been adapted for use in the SIP context. The final overload control algorithm to be described is an improved version of the acceptance rate algorithm that we have determined is particularly well suited for providing overload control in SIP-based networks. It should be understood that embodiments of the invention may utilize the occupancy algorithm, the acceptance rate algorithm, the improved acceptance rate algorithm, or another overload control algorithm.

In the occupancy algorithm, incoming calls to a server are controlled by a variable f which denotes the fraction of calls that are accepted. Thus a new call is accepted with probability f or, equivalently, blocked with probability 1−f. In applying this algorithm to the SIP context, INVITE requests may be accepted with probability f, while other messages are always accepted as long as the message buffer in the server is not full. Based on current system overload conditions, the objective of the occupancy algorithm is to dynamically adjust f to maintain high call throughput. The overload condition is based on processor utilization, $\rho$, which is periodically probed at every $\tau$ seconds. In each n-th probed epoch, the average processor utilization $\bar{\rho}(n)$ is updated and compared with a target utilization $\rho_{t\ arg}$. The average utilization can be computed as a moving average (MA) over the previous k epochs $$\bar{\rho}(n) = \frac{1}{k} \sum_{i=n-k+i}^{i=n} \rho(i),$$

or by exponentially weighted moving average (EWMA) $\bar{\rho}(n) = (1-\beta)\bar{\rho}(n-1) + \beta\rho(n)$, where $0 < \beta < 1$.

The basic idea of the occupancy algorithm is to increase f if $\bar{\rho} < \rho_{t\ arg}$, and to decrease it otherwise. Let f(n) denote the newly updated f in the current epoch n, while f(n−1) denote f updated in epoch n−1. The algorithm that updates f in each epoch is described as follows.

$$f(n) = \begin{cases} f_{min}, & \text{if } \phi \, f(n-1) < f_{min} \\ 1, & \text{if } \phi \, f(n-1) > 1 \\ \phi \, f(n-1), & \text{otherwise,} \end{cases}$$

where $f_{min}$ represents the threshold for the minimum fraction of traffic accepted. The multiplicative factor $\phi$ is given by $$\phi = \min\{\rho_{t\,arg}/\tilde{\rho}, \phi_{max}\},$$

where $\phi_{max}$ defines the maximum possible multiplicative increase in f from one epoch to the next.

In the above-cited S. Kasera et al. reference, it is argued that because ρ cannot exceed 1, the occupancy algorithm cannot decrease f by more than 10% when the system is overloaded, and thus the algorithm may react too slowly under sudden traffic surge. The basic idea of the acceptance rate algorithm is to use $\tilde{\alpha}$ in place of $\tilde{\rho}$, where $\tilde{\alpha}$ represents the average call acceptance rate into the system. The target acceptance rate $\alpha_{t\,arg}$ can be set to $\alpha_{t\,arg} = \mu \rho_{t\,arg}$, where μ is the system call-carrying capacity, which can be estimated by $\mu = \tilde{\alpha}/\tilde{\rho}$. It is suggested that $\alpha_{t\,arg}$ is updated by a EWMA with a smoother average than that for $\tilde{\alpha}$. The acceptance rate algorithm uses the following multiplicative factor:

$$\phi = \alpha_{TARG}/\tilde{\alpha}$$

We have recognized that conventional implementations of the occupancy algorithm and the acceptance rate algorithm are problematic in that they do not take into account unfinished work in the system. In particular, if $\tilde{\alpha} = \alpha_{t\,arg}$, then f(n)=f(n−1) independent of the message queue content. Instead, when $\tilde{\alpha} = \alpha_{t\,arg}$, we want to decrease f(n) if the queue content is too high and increase f(n) if the queue content is too low. A second observation is that the above algorithms tend to increase f(n) more than to decrease it for the same amount of differences (positive or negative) between the variable to be compared with the target parameter. Hence we modify $\phi$ for the improved acceptance algorithm as follows.

$$\phi = 1 - \frac{(\tilde{\alpha} - (q - q_{t\,arg})/(N\tau) - \alpha_{t\,arg})}{\alpha_{t\,arg}},$$

where q is the average queue length, in number of messages, updated using EWMA at each message arrival, $q_{t\,arg}$ is the queue target, and N is the average number of messages per call. The updating of average queue length at each message arrival may be viewed as a type of event-driven updating. Other examples of such event-driven updating are described in S. Floyd et al., "Random early detection gateways for congestion avoidance," IEEE Transactions on Networking, Vol. 1, No. 4, pp. 397-413, August 1993.

To evaluate the performance of the preceding overload control algorithms in a SIP environment, one may simulate a server that implements the full transaction layer of SIP, such as the stateful server 106 of FIG. 1. In particular, when a new request or response is processed, a client transaction is created and its state is subsequently governed by an FSM. There are four types of FSMs in SIP depending on whether the message is a request or a response and whether the message type is INVITE or non-INVITE.

Figure 4:
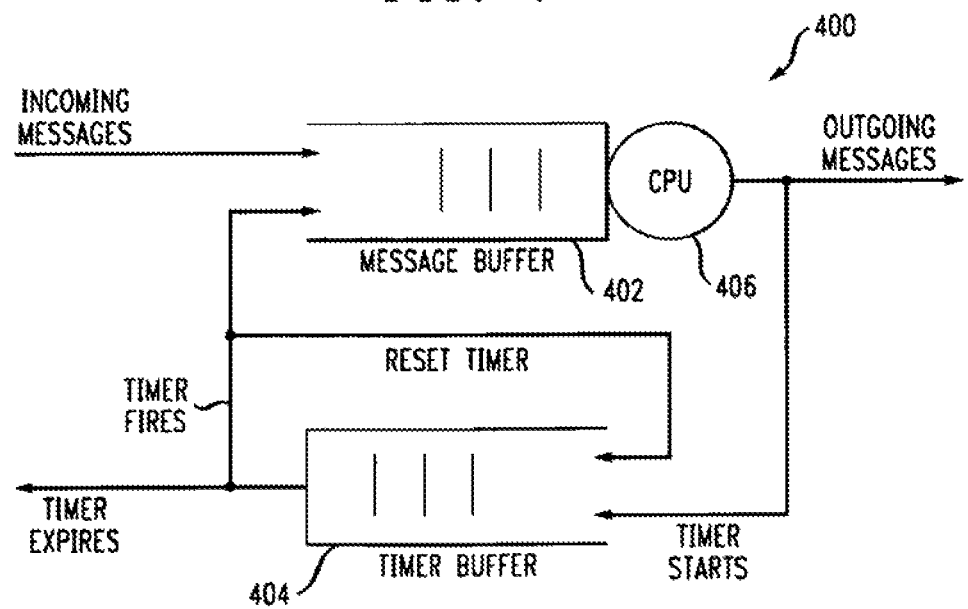
FIG. 4 is a simplified block diagram of an exemplary queuing system of a particular one of the servers of the FIG. 1 network.

FIG. 4 shows the structure of a queuing system 400 that may be implemented in a stateful server, such as server 106 of FIG. 1. The system 400 comprises a message buffer 402, a timer buffer 404 and a processor illustratively shown as central processing unit (CPU) 406. The equivalent system for a stateless server does not have a timer buffer as a stateless server behaves as a forwarder. Incoming INVITE messages are queued in the message buffer if there is available space. We assume a FIFO queuing discipline, although others can of course be used. The CPU 406 serves the message at the head of the queue, executing the necessary FSM, generating a message to the next hop, and possibly starting a timer. The timers are placed in the timer queue sorted according to their firing times. When a timer fires, its associated context is queued into the message buffer and the reset version of the timer is requeued at the timer buffer. A timer that expires simply leaves the system. If a new call is blocked, a 500 response is generated by the server.

Figure 5:
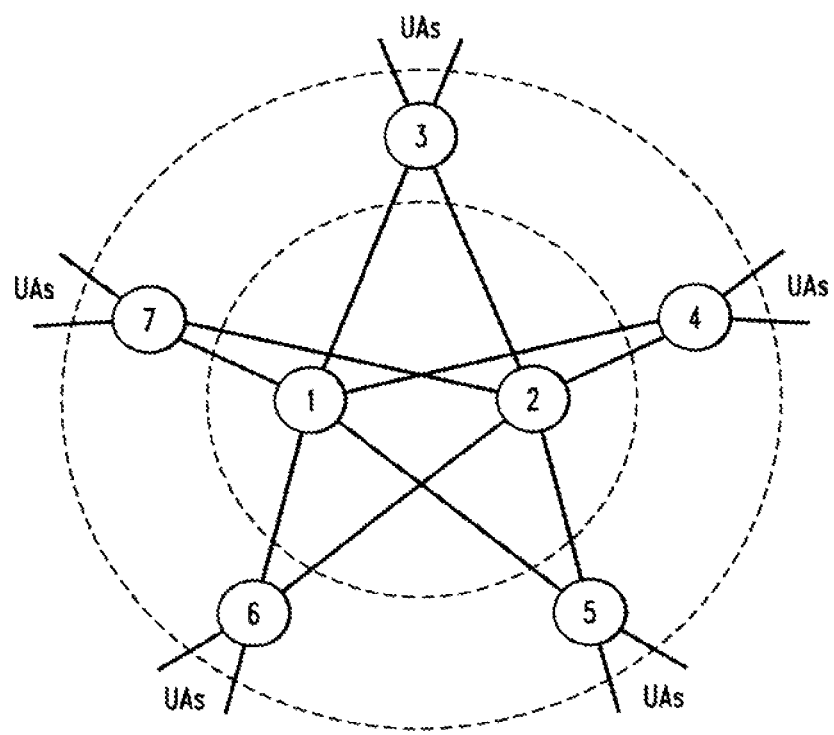
FIG. 5 shows an exemplary topology of a SIP-based network in an illustrative embodiment of the invention.

FIG. 5 shows one possible example of the topology of a SIP-based network, showing an arrangement of servers, with each server denoted by a small circle. This network includes core servers, denoted as servers 1 and 2, and ingress/egress servers, denoted as servers 3, 4, 5, 6 and 7. Each of the ingress/egress servers is coupled to a number of UAs, which are not shown, and to the core servers 1 and 2. Networks having a topology of this type will be used to illustrate the load balancing and overload control techniques of the invention, with reference to FIGS. 6-8, 11 and 12 below.

In evaluating the performance of a SIP-based network having the topology shown in FIG. 5, we assume that UAs of infinite population initiate end-to-end calls with an aggregate rate of λ calls/second according to a Poisson process. All messages between a given pair of UAs traverse through multiple servers each having a queuing system as depicted in FIG. 4. We use a call flow similar to the one in FIG. 2, except that retransmissions are fully governed by the SIP FSMs. Examples of parameter values that may be used in the overload control algorithms are listed in TABLE 1 below. It should be appreciated that these particular values are presented by way of illustrative example only, and other values, parameter sets, and overload control algorithms may be used in other embodiments. Also, the foregoing assumptions, and other assumptions made herein in describing the illustrative embodiments, should not be construed as limitations of the invention. The invention can be implemented in alternative embodiments in which one or more of these assumptions do not apply.

TABLE 1

Example Parameters Values for Overload Control Algorithms

| Parameter | Value |
| --- | --- |
| β - EWMA weight | 0.2 |
| $\rho_{t\,arg}$ - target utilization | 0.9 |
| $f_{min}$ - min. fraction of calls accepted | 0.005 |
| $\phi_{max}$ - max. increase factor in OCC | 20 |
| $q_{t\,arg}$ - average message queue length | 50 |
| N - average number of messages/call | 10 |
| τ - probed interval | 0.1 second |

We will now describe a number of overload control techniques for use in a SIP-based network or other type of network in an illustrative embodiment of the invention.

There are a number of approaches that may be used to notify overload using otherwise conventional SIP messages. One approach is to provide notification of an overloaded server by sending a 503 Service Unavailable response from the overloaded server to its upstream neighbor server. This response can state, via a Retry-After header field, an amount of time for which the overloaded server will be unavailable. Upon receipt of this message, the upstream neighbor server will not transmit any other requests to the overloaded server, regardless of the destination of the requests, for the given duration. The upstream neighbor server, however, can still transmit responses to the overloaded server. We found this mechanism to react poorly to overload since the 503 response typically causes a large volume of traffic to be diverted to other alternate servers, which in turn results in overload elsewhere. If other servers also implement the same mechanism, it is likely that overload will oscillate from one server to another.

Another message that can be used to notify overload is 500 Server Internal Error. Unlike the 503 response which is global in nature, the 500 response is only applicable locally for a given call. To control overload, the 500 response is most effectively applied in response to an INVITE request to reject a new call.

An alternate approach is not to explicitly send a notification message to indicate an overload, but to simply drop INVITE requests to block new calls. This approach in general may not work well since it may cause a large number of retransmissions.

Another important issue is with respect to the location of the server that initiates the overload notification.

Figure 11:
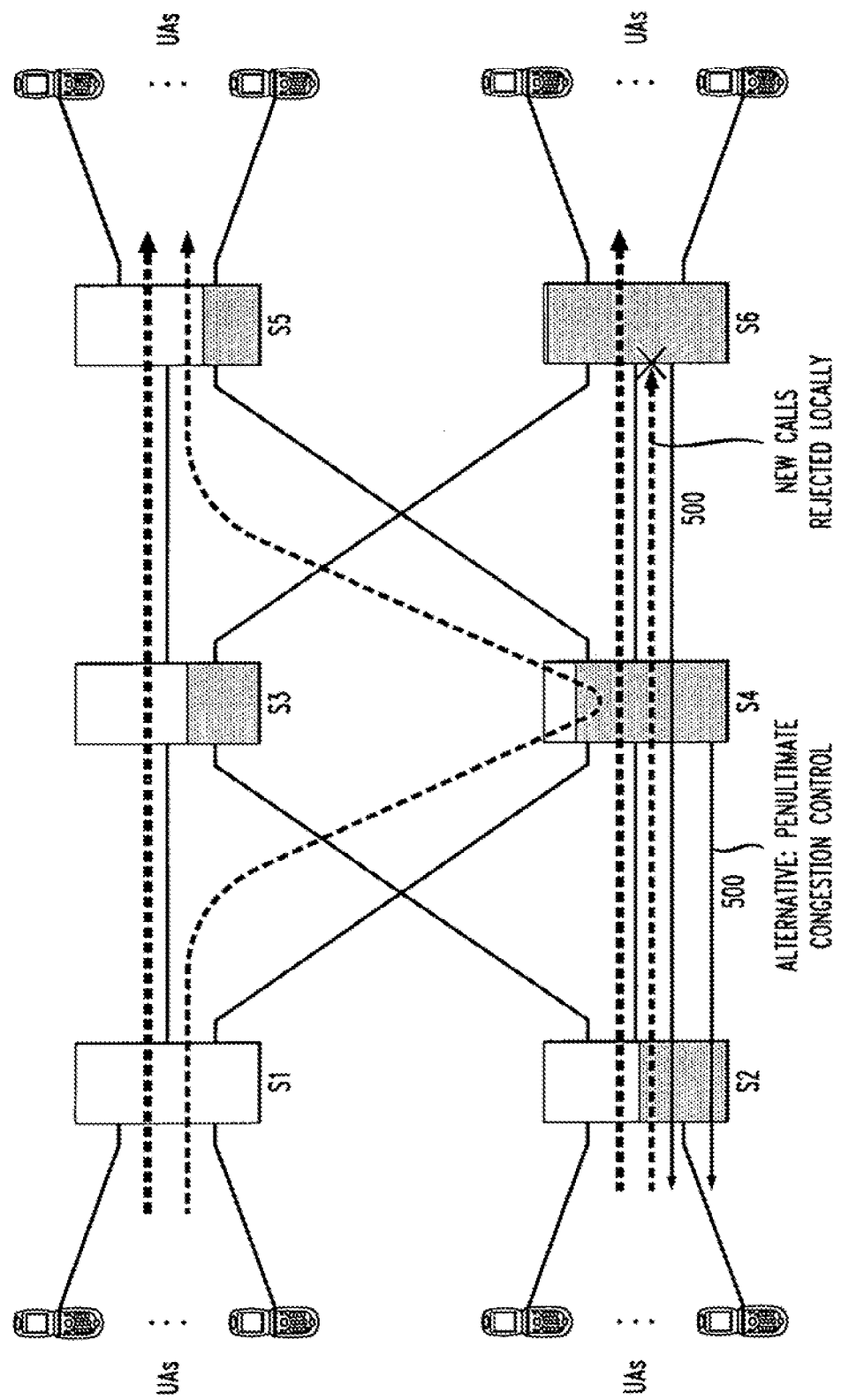
FIGS. 11 and 12 illustrate overload control utilizing respective local overload control and ingress overload control approaches.

The simplest approach, referred to herein as local overload control, is for each overloaded server to initiate the notification autonomously. An example is shown in FIG. 11, where server S6 uses its own local information to reject a call by sending a 500 response upstream, as will be described in further detail below. An advantage of this approach is that it uses only local information to make a decision. However, this approach can consume additional resources for blocking calls which can further aggravate the overloaded server.

Figure 12:
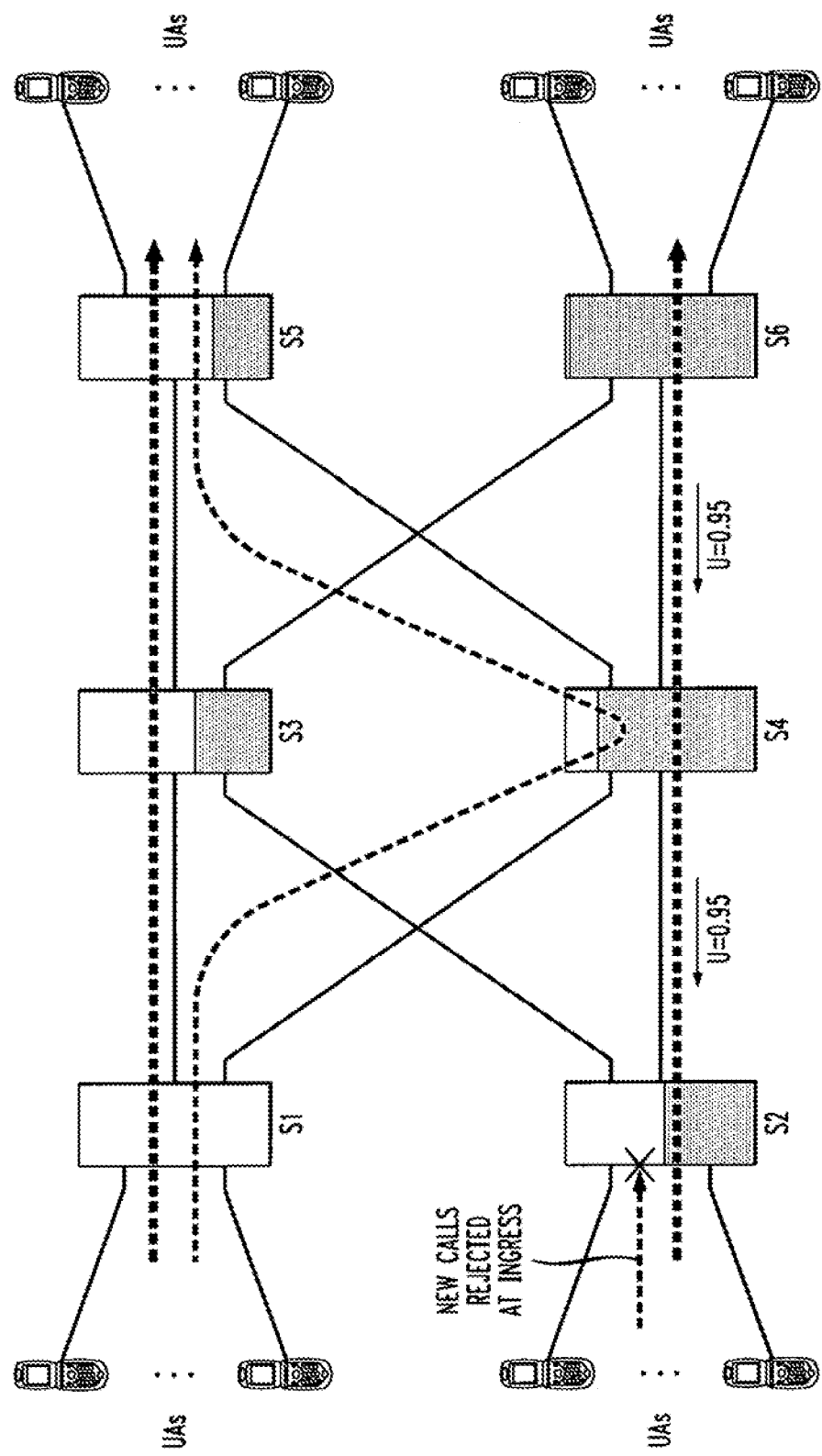

Another approach, called ingress overload control, is to propagate upstream the overload status information for each target, for example, via a new header in the 100 Trying response. Each server forwarding this information will compare its own overload status value with the received downstream overload status value and propagate the maximum value of the two overload status values upstream. For a given target, an ingress server decides to accept or block a new call based on the overload status information. An example is shown in FIG. 12, to be described in greater detail below. Ingress overload control prevents resources in the network core from being wastefully consumed for blocked calls. However, this approach may be difficult to realize since multiple routes may exist to a given target. One way to solve this problem is take the maximum overload status among the possible routes.

A third approach intermediate between the previous two is called penultimate overload control. Here the server previous to the overloaded server is the one that blocks new calls. With reference again to FIG. 11, an example is shown where the penultimate server is server S4. Thus this approach also relieves the overloaded server from having to consume additional resources. However, this approach requires more intelligent message exchanges to notify when to start and stop rejecting calls.

As noted above, illustrative embodiments of the invention may incorporate both load balancing and overload control techniques. Exemplary load balancing techniques will now be described in greater detail with reference to FIGS. 6 through 10, followed by further description of the exemplary overload control techniques with reference to FIGS. 11 and 12. Finally, an illustration of the performance enhancements attributable to combined use of such load balancing and overload control techniques will be described with reference to FIGS. 13 and 14.

Figure 6:
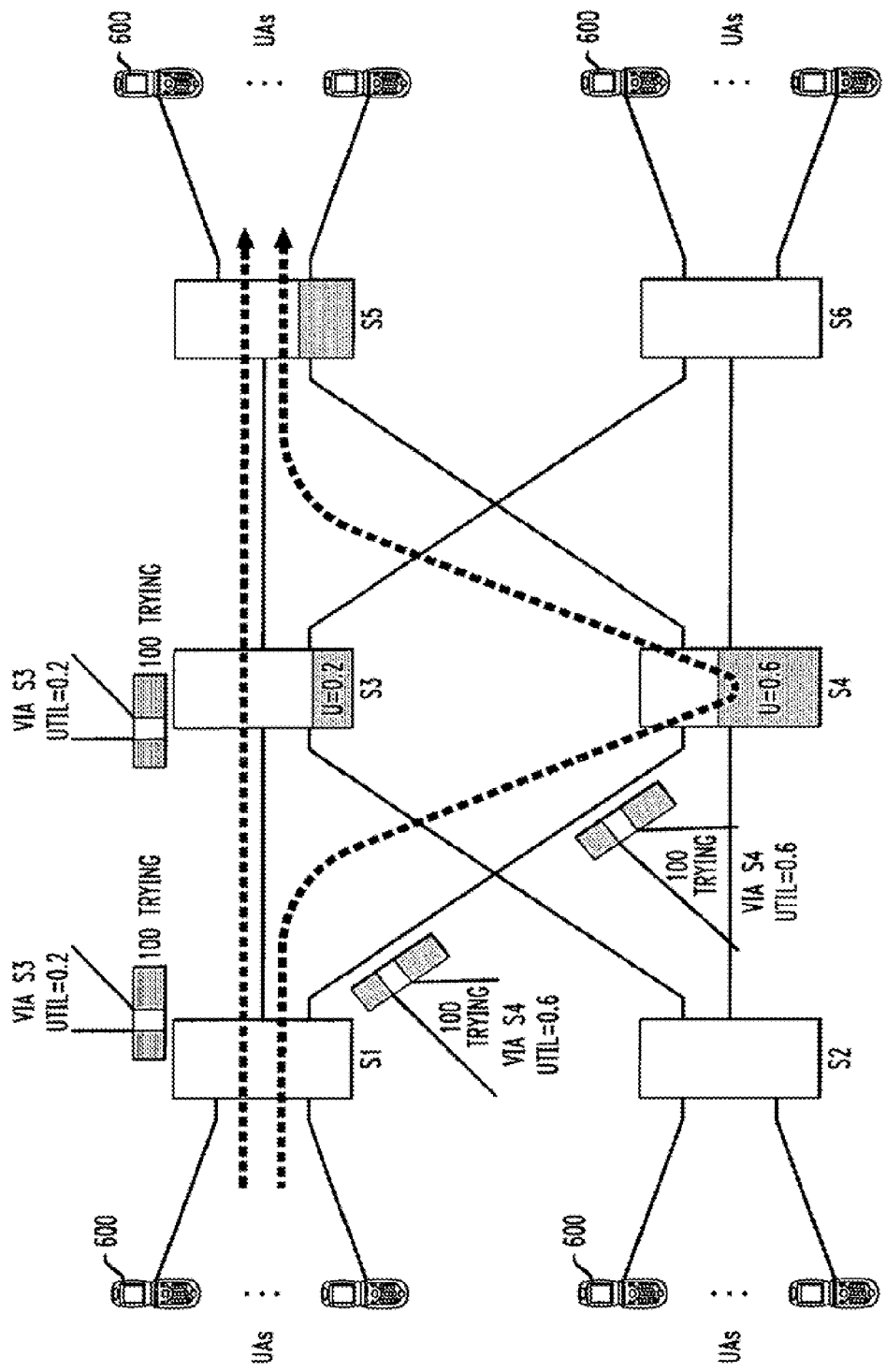
FIGS. 6 and 7 illustrate the implementation of a next-hop load balancing technique in a SIP-based network having a topology of the type shown in FIG. 5.
Figure 7:
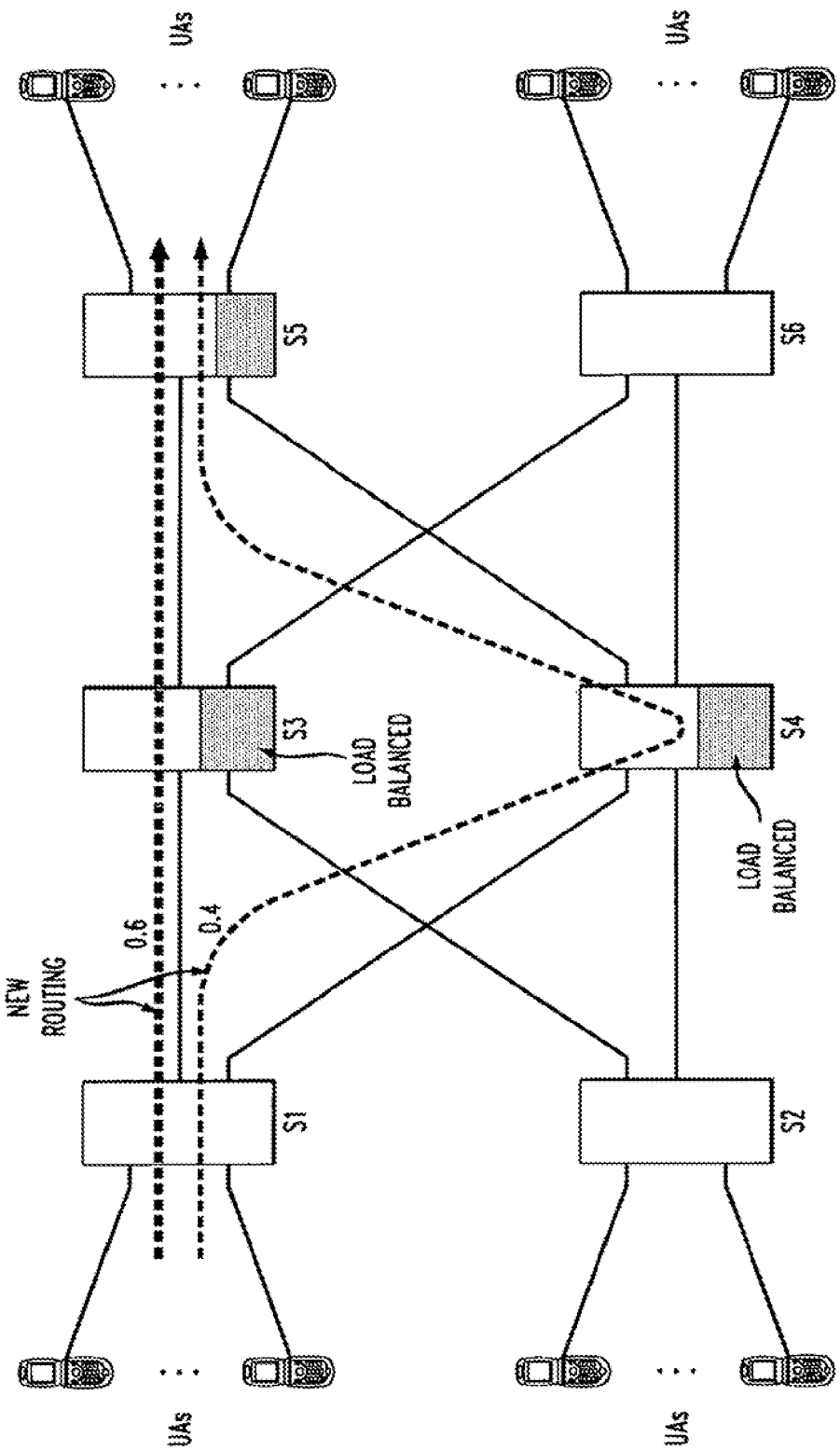

Referring now to FIGS. 6 and 7, an approach referred to herein as next-hop load balancing is illustrated. In the SIP-based network shown, UAs 600 are coupled to servers S1, S2, S5 and S6 as shown. These servers are ingress/egress servers such as those shown in the exemplary topology of FIG. 5. Each of the servers S1, S2, S5 and S6 is coupled to core servers S3 and S4. Thus, the network shown in FIGS. 6 and 7, as well as in FIGS. 8, 11 and 12, has a topology of the type shown in FIG. 5. Again, this network topology is exemplary only, and the described techniques can be adapted in a straightforward manner to numerous alternative topologies.

In the next-hop load balancing approach, each server independently and dynamically adjusts the routing probabilities to its downstream neighbors based on congestion feedback information received from those neighbors. For example, as illustrated in FIG. 6, server S1 has two routes to send SIP request messages to the UAs connected to S5, namely through downstream servers S3 and S4. Upon receiving SIP INVITE messages from S1, the next hops S3 and S4 may periodically advertise their congestion measures by attaching this information to the 100 Trying messages in response to INVITE back to S1. In the example in FIG. 6, S3 advertises that its congestion measure is a utilization u=0.2, while S4 independently advertises u=0.6 as its congestion measure.

Although the congestion measures in this example are utilization measures, a wide variety of other types of congestion measures may be used. The term "congestion measure" as used herein is therefore intended to be construed generally, so as to encompass, for example, processor utilization measures, message processing loads, buffer occupancy measures, message processing delays, or any other type of information indicative of congestion, as well as combinations of such measures or information.

From the feedback information received from S3 and S4, S1 adjusts its routing probabilities with the objective of equalizing the congestion measures at S3 and S4. Such an adjustment in routing probabilities is shown in FIG. 7, which illustrates a change in routing probabilities eventually leading to a load balanced condition at core servers S3 and S4. More specifically, responsive to feedback information indicating that server S4 had a higher utilization than server S3, server S1 adjusts its routing probabilities such that the probability of routing a given message to server S4 is 0.4, for example, while the probability of routing a given message to server S3 is 0.6, for example. Such an adjustment will tend to increase the number of messages routed to server S3 while decreasing the number of messages routed to server S4, resulting in a load balanced condition as illustrated.

Figure 8:
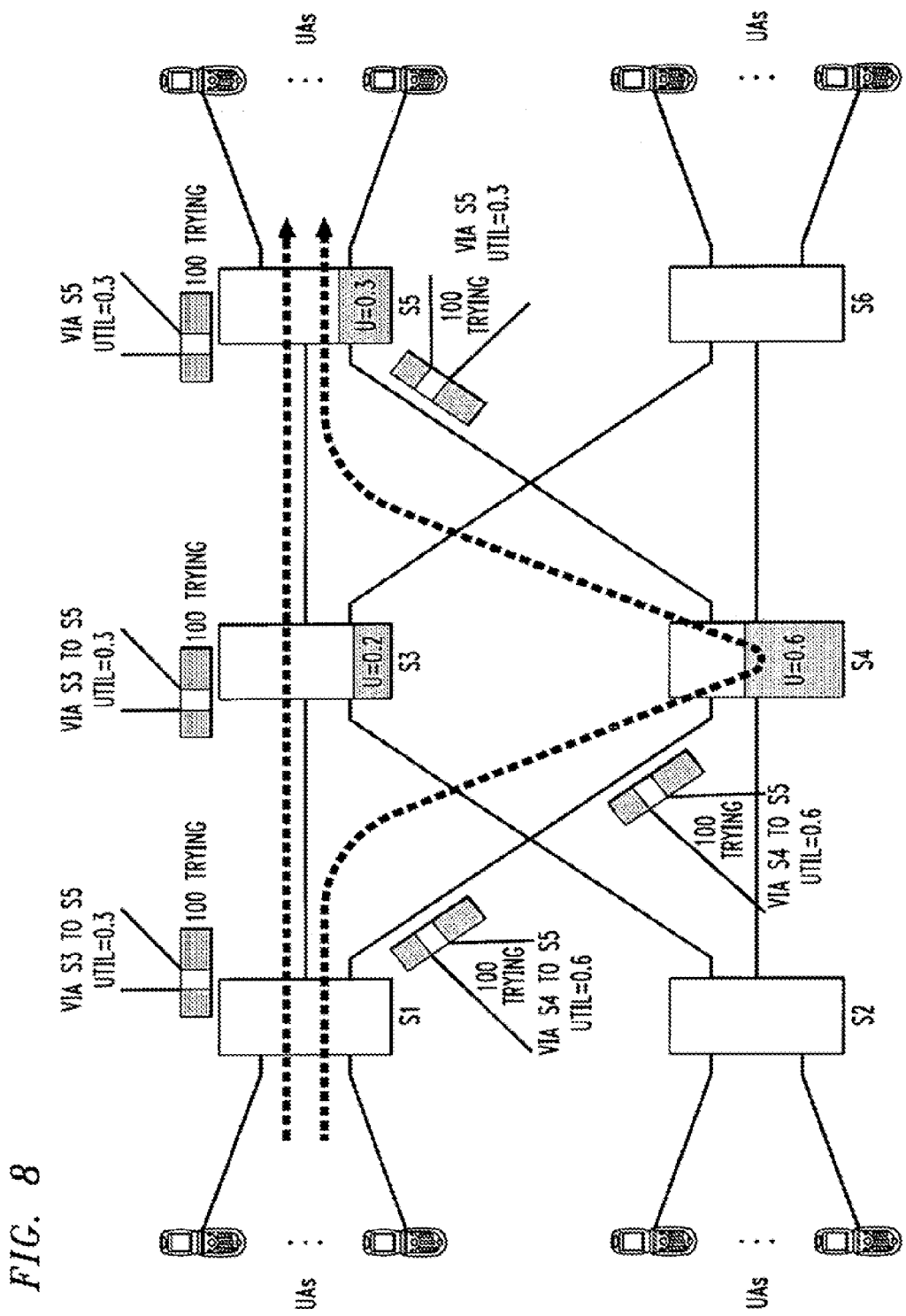
FIG. 8 illustrates an exemplary implementation of a target-based load balancing technique in a SIP-based network.
Figure 9:
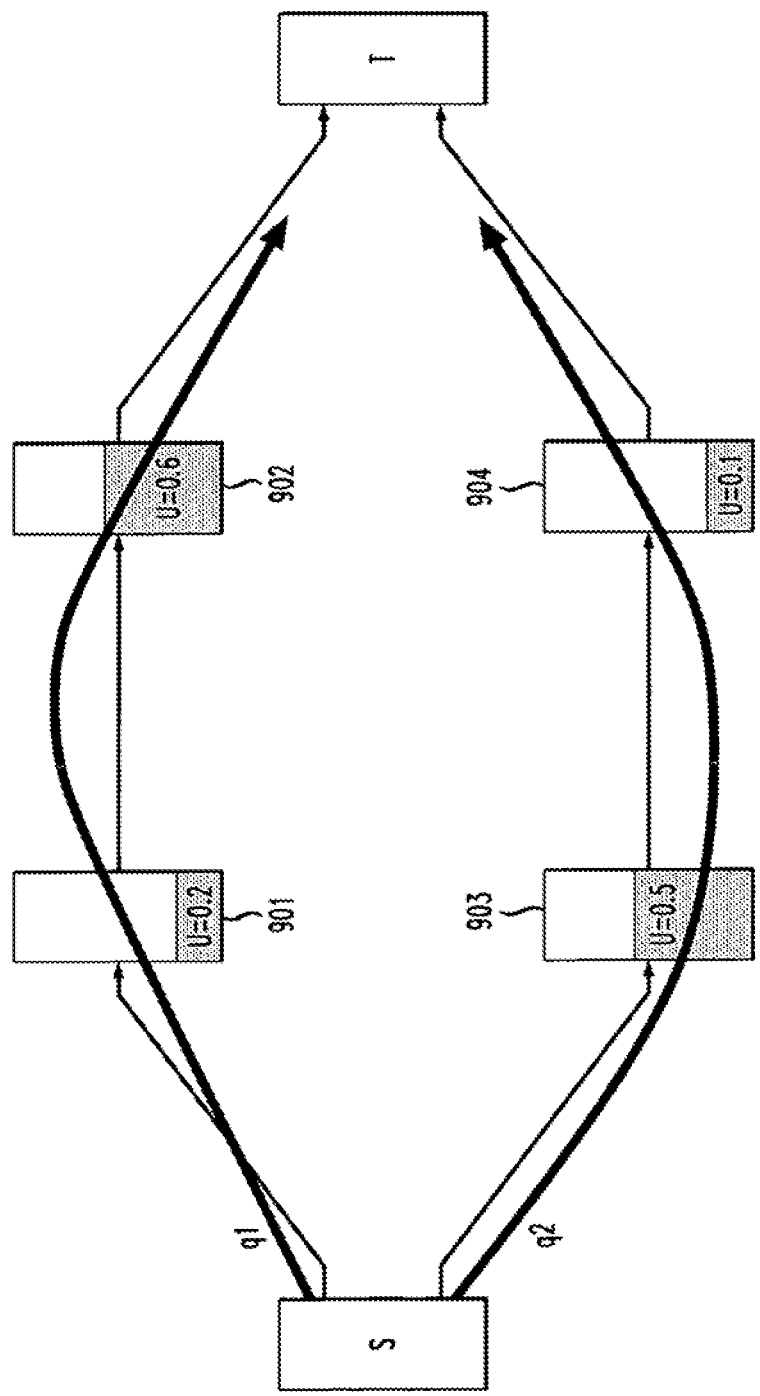
FIG. 9 is a diagram illustrating differences between next-hop and target-based load balancing techniques.

Another load balancing approach that may be utilized in a given embodiment of the invention is referred to herein as target-based load balancing. FIG. 8 illustrates this approach as applied to a SIP-based network comprising servers S1 through S6, arranged as previously described. This approach uses the congestion information along the path from the downstream server to the target server. In particular, the congestion measure represents the worst congestion measure from the downstream server to the target server. In the figure, it can be seen that servers S3, S4 and S5 have utilizations of 0.2, 0.6 and 0.3, respectively. There are two paths shown between server S1 and target server S5, one via server S3 and the other via server S4. The largest utilization for the path to S5 via S3 is the S5 utilization of 0.3, so that utilization is propagated back to S1 as feedback information. Similarly, the largest utilization for the path to S5 via S4 is the S4 utilization of 0.6, so that utilization is propagated back to S1 as feedback information. Server S1 then adjusts its routing probabilities accordingly, so as to bring about a load balanced condition.

The difference between the next-hop and target-based load balancing techniques described above is illustrated in FIG. 9. In this example, a source server S routes messages to a target server T via first and second paths having associated routing probabilities q1 and q2. The first or upper path passes through servers 901 and 902 having respective utilizations 0.2 and 0.6. The second or lower path passes through servers 903 and 904 having respective utilizations 0.5 and 0.1.

In the next-hop load balancing approach, because the 0.5 utilization value of server 903 is higher than the 0.2 utilization value of server 901, the routing probabilities q1 and q2 at server S will be adjusted such that the routing probability q1 will be increased while the routing probability q2 will be decreased until the utilization values at server 901 and server 903 become substantially equal, that is, load balanced.

In the target-based load balancing approach, the highest utilization values in the first and second paths are the 0.6 utilization value of server 902 and the 0.5 utilization value of server 903, respectively. Since the highest utilization value of the first path is higher than the highest utilization value of the second path, the routing probabilities q1 and q2 at server S will be adjusted such that the routing probability q2 will be increased while the routing probability q1 will be decreased until a load balanced condition results. It can be seen that the two approaches may produce different routing probability results for the same set of server utilization values. Although next-hop load balancing may not perform as well as target-based load balancing under certain conditions, next-hop load balancing is simpler to implement than target-based load balancing.

Figure 10:
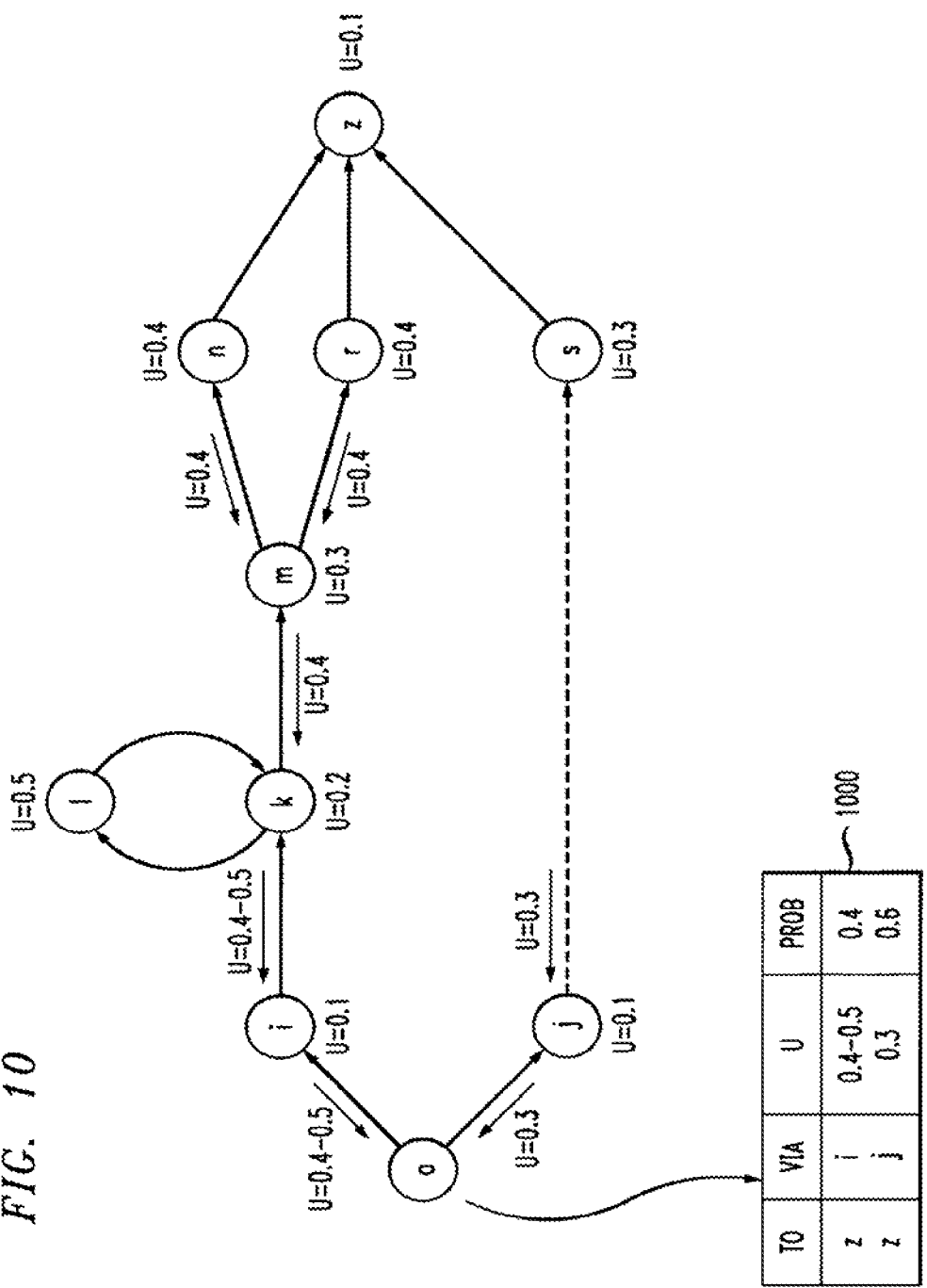
FIG. 10 shows an example of the use of feedback information in target-based load balancing.

FIG. 10 illustrates the manner in which feedback information may be propagated through a network and stored in a routing table 1000 at a given node. The network in this example includes a source node a and additional nodes i, j, k, l, m, n, r, s and z having respective utilizations of 0.1, 0.1, 0.2, 0.5, 0.3, 0.4, 0.4, 0.3 and 0.1. The paths from a to z may traverse the following routes: (1) (a, i, k, m, n, z), (a, i, k, m, r, z), (a, i, k, l, k, m, n, z), (a, j, s, z), and so on. In particular, if the path follows (a, i, k, m, n, z), the feedback information returned from i to a is 0.4. If the path follows (a, i, k, l, k, m, n, z), the feedback information returned from i to a is 0.5. This path diversity is due to spirals that are allowed in SIP.

In accordance with the target-based load balancing approach described previously, the highest utilization of the upper paths between node a and node z is in the range 0.4 to 0.5, while the highest utilization of the lower path between node a and node z is 0.3. This feedback information is propagated back through the network to node a, where is it stored in routing table 1000. Various approaches may be used to specify a single value of congestion measure for the upper paths. A simple approach is to take the worst case value of 0.5 for the upper path congestion measure. The routing table is considerably simplified for clarity of illustration, but generally includes columns for the target node, the via node indicative of a particular path to the target, the highest utilization for the particular path, and the routing probability. Of course, numerous alternative routing table formats may be used in implementing the invention.

One possible example of a distributed load balancing algorithm that may be used in implementing the next-hop or target-based load balancing approaches described above, within a given server denoted server i, is as follows:

Let $x_{ij}(d)$=fraction of traffic from $i$ via next hop $j$ (destined to target $d$)

Let $u_{ij}(d)$="smoothed" utilization via $j$ (to target $d$) observed by server $i$ At each update, compute $\Delta x_{ij}(d) = \alpha x_{ij}(d)(U_i - u_{ij}(d))$, where $U_i = \Sigma_j x_{ij}(d) u_{ij}(d)$ New traffic assignments are then given by:

$X_{ij}(d) = \max(0, x_{ij}(d) + \Delta x_{ij}(d))$, $x_{ij}(d) = X_{ij}(d) / \Sigma_j X_{ij}(d)$.

In this example, the $x_{ij}(d)$ values correspond generally to the routing probabilities described previously. The algorithm may be executed at each server periodically, for example, every T seconds. Other suitable algorithms for implementing the next-hop or target-based load balancing approaches described herein will be apparent to those skilled in the art.

As mentioned above, the previously-described local, penultimate and ingress overload control techniques will now be illustrated with reference to FIGS. 11 and 12. Although these overload techniques have already been described herein, they will now be further described with reference to specific examples involving simplified SIP-based networks having a configuration similar to those used in FIGS. 6-8 to illustrate load balancing techniques.

Referring initially to FIG. 11, the local overload control technique is illustrated. The SIP-based network in this example includes UAs and servers S1 through S6 interconnected as in the examples of FIGS. 6-8. It can be seen that server S6 has become overloaded, and thus new calls are rejected locally by this server. The mechanism that is used to notify overload in this example is the previously-described 500 Server Internal Error message. As mentioned above, the 500 response is only applicable locally for a given call, and is most effectively applied in response to an INVITE request. Thus, this approach utilizes only local information, but consumes additional local resources in rejecting the calls.

Also illustrated in FIG. 11 is the alternative penultimate overload control approach, which advantageously relieves the overloaded server S6 from the additional processing associated with generation of the 500 response. This is achieved by having the call rejected at server S4, rather than at the overloaded server S6. S4 will therefore need information from its downstream neighbor S6.

FIG. 12 shows the ingress overload control approach, in which new calls are rejected at an ingress node, which is server S2 in the example shown. Feedback information is propagated through the network from server S6, indicating an overload condition in the form of a utilization value of 0.95 at server S6. Server S2 makes use of this information to reject a new call from being directed to server S6. Advantageously, this ingress overload control approach prevents resources in the network core from being unnecessarily consumed when calls are blocked. However, it makes use of path information, which may not be readily available in some implementations.

As is apparent from the foregoing description, the illustrative embodiments described in conjunction with the examples of FIGS. 6-12 utilize feedback information to provide load balancing and overload control. This feedback information and the associated load balancing and overload control techniques in accordance with one aspect of the invention provide an enhanced type of SIP referred to herein as "Overload-Safe SIP" or OS-SIP. It should be pointed out that, although OS-SIP utilizes both load balancing and overload control, other embodiments may utilize either load balancing or overload control, but not both.

Figure 13:
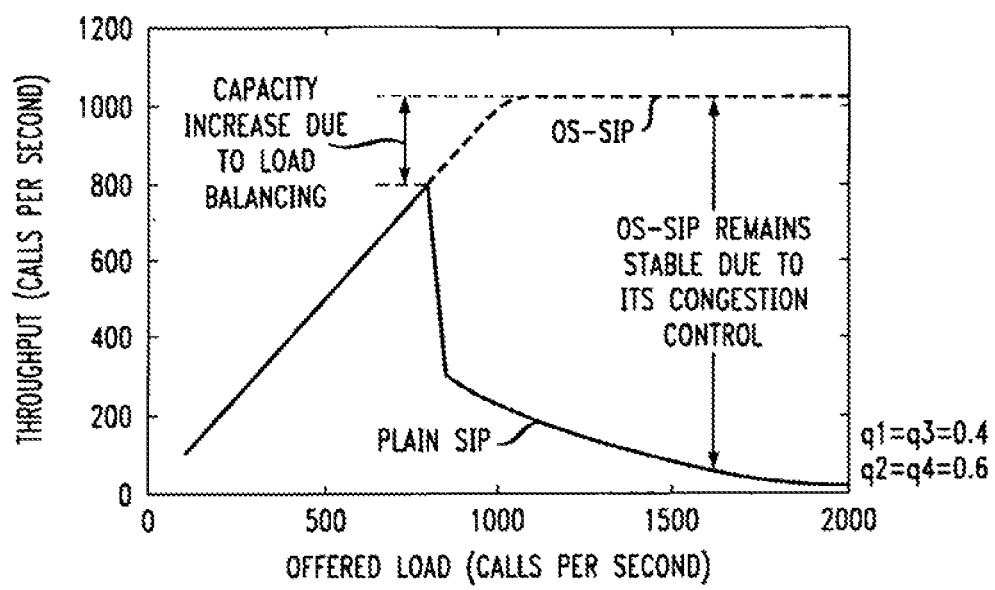
FIG. 13 shows plots of throughput as a function of offered load in a SIP-based network, illustrating the manner in which illustrative load balancing and overload techniques of the present invention avoid a congestion collapse condition such as that shown in FIG. 3.
Figure 14:
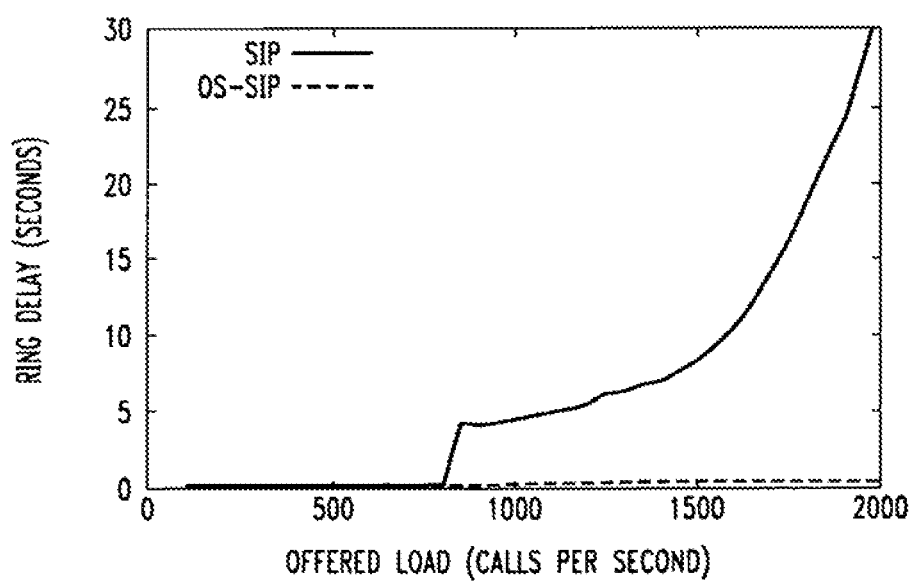
FIG. 14 shows plots of ring delay as a function of offered load in a SIP-based network, illustrating the manner in which illustrative load balancing and overload techniques of the present invention can avoid excessive delay that may result from the use of conventional SIP techniques.

FIGS. 13 and 14 show plots of throughput and ring delay, respectively, as functions of offered load, comparing the performance of conventional SIP to OS-SIP. These plots are generated for an exemplary SIP-based network of the type shown in FIGS. 6-8, 11 and 12, with six servers S1 through S6 interconnected as shown in those figures. It was assumed that the underlying IP network was congestion-free, and that the calls arrived in accordance with a Poisson process. Failed calls are assumed to be retried with probability 0.1. Also, call holding time is assumed to exponentially distributed with mean of 150 seconds, and the ring-to-answer delay is assumed to be uniformly distributed with mean of 3 seconds. The routing probabilities from servers S1 and S2 are given by {q1, q2} and {q3, q4}, respectively, with q1=q3=0.4 and q2=q4=0.6, initially. The relative speedup factors for the servers are: S1=0.6, S2=0.6, S3=0.6, S4=0.3, S5=0.5, and S6=0.5. Also, all servers in this example are assumed to be stateful.

Referring now to FIG. 13, plots of throughput as a function of offered load are shown, comparing conventional or "plain" SIP to OS-SIP. The throughput for conventional SIP follows the solid curve, and in this example exhibits a congestion collapse problem at about 800 calls per second. The OS-SIP performance is shown by the dashed curve. It is readily apparent that OS-SIP avoids the congestion collapse problem exhibited by conventional SIP, due to the use of overload control. Also, OS-SIP exhibits a capacity increase relative to conventional SIP, to a maximum throughput of about 1000 calls per second. This increased capacity is attributed to the use of load balancing techniques as described herein. The plots in FIG. 13 demonstrate that OS-SIP delivers significant performance improvement and offers high-reliability service independent of traffic loads.

With reference to FIG. 14, it is further apparent that OS-SIP also provides a substantial improvement in ring delay relative to conventional SIP. More specifically, OS-SIP ensures acceptable delay performance even when the traffic load becomes heavy.

Again, it is to be appreciated that the particular parameters, assumptions, network topologies and other features of the illustrative embodiments described above are presented by way of example only. Although particularly useful with SIP-based networks, such as IMS networks, the techniques described herein can be applied to a wide variety of other types of communication networks, using any of a number of different communication protocols. These and numerous other alternative embodiments within the scope of the appended claims will be readily apparent to those skilled in the art.

What is claimed is:

1. An apparatus for facilitating overload control in a Session Initiation Protocol (SIP)-based network including an overloaded SIP server, the apparatus comprising:
a first SIP server of the network configured to receive SIP response messages from at least one downstream SIP server of the network, the downstream SIP server being associated with a path between the first SIP server and a target SIP server, the downstream SIP server being the overloaded SIP server and a nearest neighboring SIP server of the first SIP server, one or more of the SIP response messages including feedback information which comprises a utilization measure of the downstream SIP server;
wherein the first SIP server is further configured to generate a blocking message for delivery to a user agent associated with the network based on the feedback information, the blocking message comprising a SIP server internal error response message used to control overload of the overloaded SIP server; and
wherein a message routing process is adjusted responsive to the blocking message to route at least one new call over another path between the first SIP server and the target SIP server that does not include the downstream SIP server.

2. The apparatus of claim 1 wherein the SIP response messages comprise at least one SIP 500 response message and wherein the blocking message is generated based at least in part on the SIP 500 response message.

3. The apparatus of claim 1 wherein the SIP response messages comprise at least one SIP 100 response message and wherein the blocking message is generated based at least in part on the SIP 100 response message.

4. The apparatus of claim 3 wherein the blocking message is generated based at least in part on an overload status value in a header of the SIP 100 response message.

5. The apparatus of claim 1 wherein the SIP response messages are received in response to at least one SIP INVITE request sent from the first SIP server.

6. The apparatus of claim 1 wherein the downstream SIP server comprises the target SIP server.

7. The apparatus of claim 1 wherein the downstream SIP server comprises an egress server of the network.

8. The apparatus of claim 1 wherein the downstream SIP server comprises a core server of the network.

9. The apparatus of claim 1 wherein the first SIP server comprises an ingress server for the user agent.

10. The apparatus of claim 1 wherein the first SIP server comprises a downstream SIP server relative to an ingress SIP server for the user agent.

11. The apparatus of claim 1 wherein a message routing process is adjusted responsive to the blocking message to reject at least one new call that would otherwise utilize the path between the first SIP server and the target SIP server that includes the downstream SIP server.

12. The apparatus of claim 1 wherein the blocking message comprises a SIP 500 Server Internal Error response message.

13. An apparatus for facilitating overload control in a Session Initiation Protocol (SIP)-based network including an overloaded SIP server, the apparatus comprising:
a first SIP server of the network configured to receive SIP response messages from at least one downstream SIP server of the network, the downstream SIP server being associated with a path between the first SIP server and a target SIP server, the downstream SIP server being the overloaded SIP server and a nearest neighboring SIP server of the first SIP server, one or more of the SIP response messages including feedback information which comprises a utilization measure of the downstream SIP server;
wherein the first SIP server is further configured to generate a blocking message for delivery to a user agent associated with the network based on the feedback information, the blocking message comprising a SIP server internal error response message used to control overload of the overloaded SIP server; and wherein the feedback information comprises a highest utilization measure of among utilization measures of a plurality of downstream SIP servers in the path between the first SIP server and the target SIP server.

14. A method for facilitating overload control in a Session Initiation Protocol (SIP)-based network including an overloaded SIP server, the method comprising:

receiving, by a first SIP server of the network, SIP response messages from at least one downstream SIP server of the network, the downstream SIP server being associated with a path between the first SIP server and a target SIP server, the downstream SIP server being the overloaded SIP server and a nearest neighboring SIP server of the first SIP server, one or more of the SIP response messages including feedback information which comprises a utilization measure of the downstream SIP server; and generating, by the first SIP server, a blocking message for delivery to a user agent associated with the network based on the feedback information, the blocking message comprising a SIP server internal error response message used to control overload of the overloaded SIP server;

wherein a message routing process is adjusted responsive to the blocking message to route at least one new call over another path between the first SIP server and the target SIP server that does not include the downstream SIP server.

15. The method of claim 14 wherein a message routing process is adjusted responsive to the blocking message to reject at least one new call that would otherwise utilize the path between the first SIP server and the target SIP server that includes the downstream SIP server.

16. The method of claim 14 wherein:

the SIP response messages comprise at least one SIP 100 response message;

the blocking message is generated based at least in part on the SIP 100 response message; and the blocking message is generated based at least in part on an overload status value in a header of the SIP 100 response message.

17. The method of claim 14 wherein the feedback information comprises a highest utilization measure of among utilization measures of a plurality of downstream SIP servers in the path between the first SIP server and the target SIP server.

18. An apparatus for facilitating overload control in a Session Initiation Protocol (SIP)-based network including an overloaded SIP server, the apparatus comprising:

a downstream SIP server of the network configured to send SIP response messages to a first SIP server of the network, the downstream SIP server being associated with a path between the first SIP server and a target SIP server, the downstream SIP server being the overloaded SIP server and a nearest neighboring SIP server of the first SIP server, one or more of the SIP response messages including feedback information which comprises a utilization measure of the downstream SIP server;

wherein the feedback information is utilized to generate a blocking message for delivery to a user agent associated with the network, the blocking message comprising a SIP server internal error response message used to control overload of the overloaded SIP server; and wherein a message routing process is adjusted responsive to the blocking message to route at least one new call over another path between the first SIP server and the target SIP server that does not include the downstream SIP server.

19. The apparatus of claim 18 wherein:

the SIP response messages comprise at least one SIP 100 response message;

the blocking message is generated based at least in part on the SIP 100 response message; and the blocking message is generated based at least in part on an overload status value in a header of the SIP 100 response message.

20. The apparatus of claim 18 wherein the feedback information comprises a highest utilization measure of among utilization measures of a plurality of downstream SIP servers in the path between the first SIP server and the target SIP server.

* * * * *